United States Patent
Rabaeh et al.

(10) Patent No.: US 10,209,368 B2
(45) Date of Patent: Feb. 19, 2019

(54) METHOD OF MAKING RADIOCHROMIC DOSIMETER USING CALCEIN DYE

(71) Applicant: The Hashemite University, Zarqa (JO)

(72) Inventors: Khalid A. Rabaeh, Zarqa (JO); Feras M. Aldweri, Zarqa (JO); Kefaia N. Al-ahmad, Zarqa (JO)

(73) Assignee: Hashemite University, Zarqa (JO)

( * ) Notice: Subject to any disclaimer, the term of this patent is extended or adjusted under 35 U.S.C. 154(b) by 320 days.

(21) Appl. No.: 15/262,695

(22) Filed: Sep. 12, 2016

(65) Prior Publication Data

US 2018/0074213 A1 Mar. 15, 2018

(51) Int. Cl.

| | |
|---|---|
| *B29B 7/00* | (2006.01) |
| *G01T 1/04* | (2006.01) |
| *C08J 5/18* | (2006.01) |
| *B29C 41/02* | (2006.01) |
| *B29C 41/42* | (2006.01) |
| *B29C 65/50* | (2006.01) |
| *B29K 31/00* | (2006.01) |
| *B29L 31/00* | (2006.01) |

(52) U.S. Cl.
CPC ............. *G01T 1/04* (2013.01); *B29C 41/02* (2013.01); *B29C 41/42* (2013.01); *B29C 65/50* (2013.01); *C08J 5/18* (2013.01); *B29K 2031/04* (2013.01); *B29K 2995/002* (2013.01); *B29K 2995/0018* (2013.01); *B29L 2031/752* (2013.01); *C08J 2329/04* (2013.01)

(58) Field of Classification Search
CPC ........... G01T 1/04; C08J 5/18; C08J 2329/04; B29C 41/02; B29C 41/42; B29C 65/50; B29L 2031/752; B29K 2031/04; B29K 2995/002; B29K 2995/0018
See application file for complete search history.

(56) References Cited

U.S. PATENT DOCUMENTS

2006/0145091 A1* 7/2006 Patel .......................... G01T 1/04
250/474.1

* cited by examiner

*Primary Examiner* — Vishal I Patel
(74) *Attorney, Agent, or Firm* — Geeta Kadambi; Riddhi IP LLC

(57) ABSTRACT

Calcein-PVA film and Calcein solution dosimeters is made for high dose applications. Systematic evaluation of dosimetric properties for the films is being conducted and was found useful for routine dosimeter in industrial radiation processing. The color bleaching of CA-PVA film and CA solution increases gradually with increasing absorbed dose in the dose range of 5-30 kGy for film, and 0.25-1 kGy for solution. The dose sensitivity increases significantly with increase of concentration of CA dye. The response of the CA-PVA films was slightly affected by relative humidity and temperature. The stability of film dosimeters and solutions after irradiation was very high and were stable for up to 30 days.

6 Claims, 4 Drawing Sheets

METHOD OF MAKING RADIOCHROMIC DOSIMETER USING CALCEIN DYE

FIELD OF INVENTION

A method of making a radiochromic dosimeter film using radiochromic dye for high dose applications is described. More specifically to make radiochromic dosimeter containing Calcein (CA) dye is introduced.

BACKGROUND

High and low dose radiation processing applications require a wide range of dosimetry control in order to assure that the correct dose is delivered. Dosimeters are used for measuring the exposure, kerma and absorbed dose, resulting from the interaction of ionizing radiation with matter. Radiochromic films are one category of dosimeters which depend on permanent change in color due to a radiation-induced chemical changes. The films do not require any latent thermal, optical or chemical development or amplification (Kovács, A., et. 1999.). There are various types of radiochromic film dosimeters. The competition between these systems depends on their accuracy, the lower and higher dose to be measured and their behavior under different environmental conditions such as dose rate, temperature, humidity, etc.

A formyl violet cyanide liquid dosimetry system (Ebraheem, S., et.al. 2002) depends on aqueous solution of formyl violet cyanide in the dose range 400-4000 Gy. This system was investigated for potential use in radiation dosimetry using both absorption and fluorescence. It was observed that the dose range depends on the concentration of the dye.

Calderon, J. M., et.al. (2007). investigated ferrous ammonium sulfate as a high dose dosimeter in the range from 30 kGy to 550 kGy with very low temperatures in the range from 77 K (liquid Nitrogen) to 300 K. The analysis of the samples was made by UV spectroscopy and EPR, it was observed that the change in absorbance of the salt to radiation was linear with respect to the absorbed dose. In this study, it is very interesting to notice the high range of irradiation and at very low temperatures.

Seito, H., et.al. (2009). conducted a study on the use of clear Perspex (poly methyl methacrylate) dosimeter and evaluated its characteristics. In his study the Radix W, commercially available un-dyed PMMA dosimeters were studied, in the dose range from 0.5 to 8.0 kGy, the characteristics of dose response, the effect of irradiation temperature and stability after irradiation were examined, and different wave lengths between 270-320 nm were used to read the absorbance. It was found that the suitable wave length is 280 nm for measuring the dose in the range from 0.5 to 8.0 kGy and the dose response is higher for higher temperature in the range of 20-40° C., and it was found that the decrease in the dosimeter dose response is less than 1% within 24 hours after irradiation. The clear PMMA dosimeter is very useful, since the range of 0.5 to 8.0 kGy is very useful in radiation processing especially in the food irradiation.

Recently, a radio-chromic film dosimeter based on polyvinyl butyral (PVB) containing 3-(4,5-Dimethylthiazol-2-yl)-2,5-diphenyltetrazolium bromide (MMT) (Basfar, A et.al. U.S. Pat. No. 8,691,135) and a radio-chromic film dosimeter based on polyvinyl butyral (PVB) containing Nitro Blue Tetrazolium (NBT) for high dose applications (Basfar, A, et.al., EP2395045). The MMT-PVB and NBT-PVB film dosimeters showed good performance for dose measurements as routine dosimeters in the dose range of 5-40 and 5-60 kGy respectively.

There is a need to find an optimal and sensitive radiochromic dosimeter that would cover the temperature, withstand humidity factors and exposure range.

SUMMARY

Several methods for optimizing the dye concentration, film composition, testing for optimal dye concentration and film thickness are being presented. The dye used was Calcein (CA) and the polymer used for the film development is polyvinyl alcohol (PVA). In one embodiment, radiochromic solutions and polyvinyl alcohol (PVA) films containing different concentrations of Calcein dye have been described for a high dose dosimeter is used. In another embodiment, the dosimeter is irradiated with gamma rays from $^{60}CO$ source at doses from 5 to 30 kGy for film and from 0.25 to 1 kGy for solution. UV/vis spectrophotometry was used to investigate the absorbance (optical density) of unirradiated and irradiated films and solutions in terms of absorbance at 493 nm for film and 496 nm for solution. The effects of temperature, relative humidity and stability of the response of films and solutions after irradiation were investigated. The results show that these films could be used as dosimeter in industrial radiation processing. The useful dose range of developed Calcein-PVA film and solution dosimeters is in the range of 5-20 kGy and 0.25-1 kGy respectively.

UV/vis spectrophotometry was used to investigate the absorbance (optical density) of unirradiated and irradiated films and solutions in terms of absorbance at 493 nm for film and 496 nm for solution. Radio-chromic dosimeters containing different concentrations of Calcein dye is introduced in this invention.

The method, composition and components herein may be implemented in any means for achieving various aspects. Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which.

Figure 1:
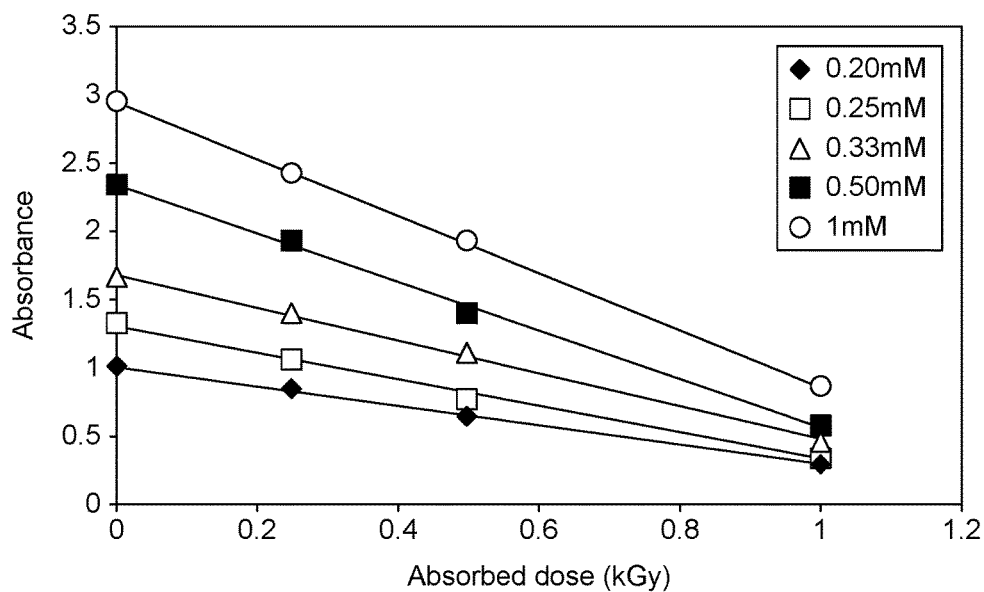
FIG. 1: Absorbance of CA solution containing Different concentration of CA as a function of absorbed dose up to 1 kGy.

Other features of the present embodiments will be apparent from the accompanying drawings and from the detailed description that follows.

DETAILED DESCRIPTION

Several method, components and dosages are disclosed to make a film dosimeter containing Calcein Dye. Although the present embodiments have been described with reference to specific example embodiments, it will be evident that various modifications and changes may be made to these embodiments without departing from the broader spirit and scope of the various embodiments.

The stock solution of Calcein dye was prepared by dissolving (0.051) g of calcein indicator (Sigma-aldrich, USA) in (300) ml distilled water. The solution was stirred at room temperature for 5 minutes to ensure the homogenous dye stock solution. Another four different solution concentrations were prepared from the stock solution (see Table 1). The solution was stirred at room temperature for 3 hours to ensure a homogenous dye solution. The solutions were kept in 3 ml sealed glass ampoules and stored in the dark at room temperature.

TABLE 1

Various Concentrations of Calcein dye solution.

| Solution No. | Concentration (mM) |
| --- | --- |
| 1 | 0.20 |
| 2 | 0.25 |
| 3 | 0.33 |
| 4 | 0.50 |
| 5 | 1 |

Polyvinyl alcohol (PVA) solutions were prepared by dissolving 21.0 g PVA powder (Mw 50,000 g/M, Sigma-Aldrich, USA) in 300 ml of distilled water at temperature of 70° C. The solution was magnetically stirred at 70° C. temperature for 24 hours and then left to cool at room temperature. After cooling to room temperature, PVA solution was divided into 25 ml samples. Then, different amounts of Calcein stock solution were added to 25 ml PVA solution. Mixtures were stirred continuously for 3 hours using a magnetic stirrer in order to obtain a uniformly dyed PVA solution, as presented in Table 2. Calcein-PVA solutions were poured onto horizontal plastic plates and dried at room temperature for about 3 to 5 days depending on the concentration of Calcein-PVA Films were peeled off and cut into 1×3 cm pieces, dried, stored and prepared for irradiation. The drying is completed when the thickness of the films is constant. The films were protected from sunlight, fluorescent light, moisture and dust by wrapping them with black plastic tape. The mean thickness of the obtained film is 158±10 μm with very good homogeneity

TABLE 2

Various compositions of Calcein-PVA film dosimeter.

| Film No. | Concentration (mM) |
| --- | --- |
| 1 | 0.10 |
| 2 | 0.14 |
| 3 | 0.17 |
| 4 | 0.20 |

Radiochromic dosimeters were irradiated with 1.25 MeV gamma-ray from $^{60}$Co source at a mean dose rate of 0.48 kGy/h (Gamma-cell type PX-γ-30, Issledovatelj, Russia). The dose rate of the source was calibrated using ferrous sulphate (Fricke) dosimeter. Irradiations were conducted at room temperature, three films and solutions of different concentrations were represented for each radiation dose, but no significant differences were found during measurements. Range of 33.6-97.2% relative humidity values were used to study the effect of humidity on the performance of film dosimeters (Calcein-PVA) during irradiation. These humidity values were achieved using the following saturated salt solutions, $MgCl_2 \times 6H_2O$ (33.6%), NaCl (75.5%) and $K_2SO_4$ (97.2%) according to the technique devised by (Levine, H., et.al. 1979). The films irradiated in a given humidity environment were kept in the same environment for 3 days before irradiation to ensure the suitable equilibrium.

Ultraviolet-visible UV-VIS spectrophotometer is an instrument to measure the absorbance of spectra of radiation in the near infrared (700-1100 nm), visible (350-700 nm) and ultraviolet (190-350 nm) regions. The sample was placed in the sample compartment for scanning and using air as a reference for film, and distilled water as a reference for solution. The absorption spectra of irradiated Calcein film and solution dosimeters in the wavelength range from 400-800 nm were measured using UV-VIS spectrophotometer (Shimadzu, Model 1700), Japan. The scan temperature of Calcein dosimeter was conducted using Thermostated UV cary, (Agilent, USA). Three samples at each absorbed dose were measured, but no significant differences in their characteristics were found during measurements. In general, evaluation of Calcein dosimeters followed ASTM standard guide for performance characterization of dosimeters and dosimetry systems for use in radiation processing. (Standard Guide for Performance Characterization of Dosimeters and Dosimetry Systems for Use in Radiation Processing. 2009. ASTM E2701-09).

Figure 2:
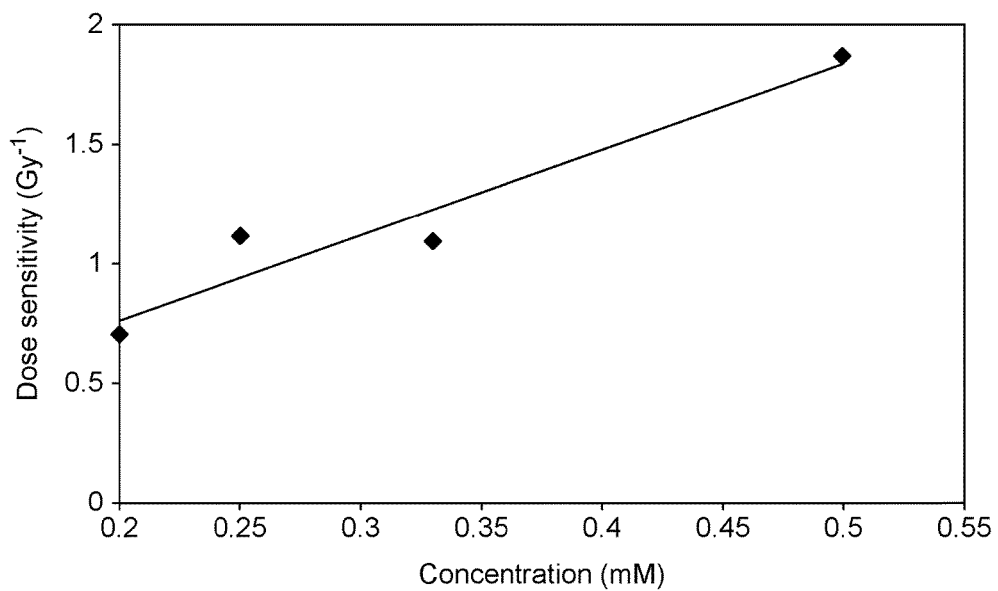
FIG. 2: The dose sensitivity for different Calcein solution.

The effect of the dye concentrations on the gamma irradiation-induced color bleaching of Calcein solution was investigated by preparing different compositions of Calcein solutions. The absorption spectra of un-irradiated as well as irradiated Calcien solution dosimeters were measured in the range 400-800 nm. The dose response curves were established in terms of change in absorption peak measured at 496 nm versus the absorbed dose Dose response of Calcein solution with different concentrations of Calcein dye is shown in FIG. 1. The colour bleaching of Calcein dye solution increases gradually with increasing absorbed dose up to 1 kGy, which can be seen from decrease of the individual relative absorbance-dose curve. As the absorbed dose increases, more hydrate electrons and free radicals are generated leading to breakage of bonds of Calcein dye, resulting in the disappearance of chromophore. The dose sensitivity was taken from the absolute slope of linear plot of Absorbance versus absorbed dose of FIG. 1. The results show that the sensitivity value increases gradually with increasing Calcein dye concentrations as shown in FIG. 2, leading to the increase of bleaching of Calcein solution dosimeters. Indicating that solution containing higher concentrations of Calcein dye is more suitable for higher dose dosimetry. The results also demonstrated that the absorbance values have a high precision values with standard deviation values (Precision≤6.8%), indicating that this dosimeters possess a high degree of reliability for radiation processing industry.

Figure 3:
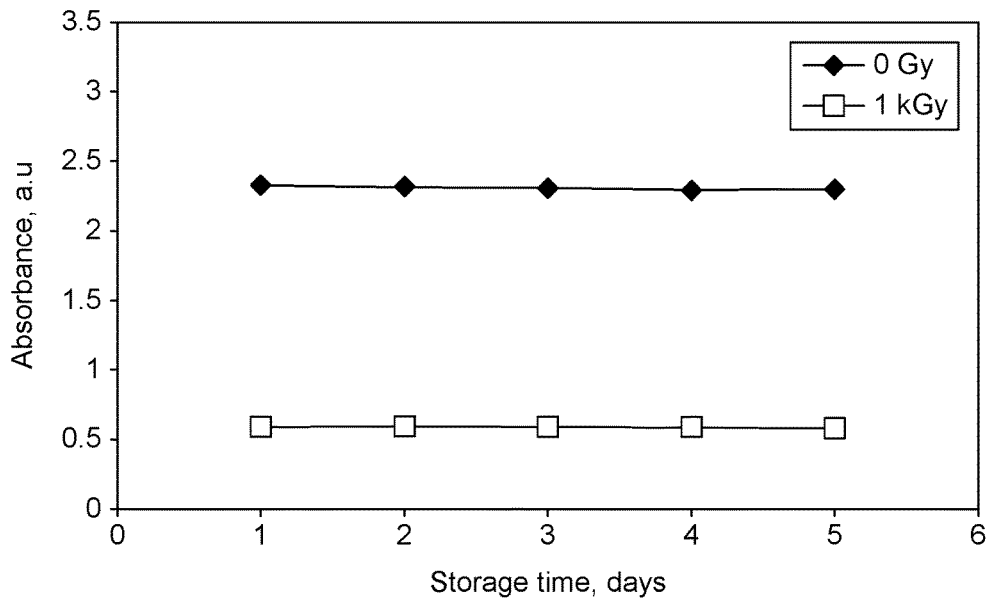
FIG. 3: Absorbance of 0.5 mM Calcein solution at 0 and 1 kGy

The stability of Calcein solution dosimeters was tested by measuring the absorbance of solution containing 0.5 mM Calcein. The absorbance of the unirradiated and irradiated Calcein solutions (0, 1 kGy) was measured every 24 h using UV/vis spectrophotometer for 5 days after irradiation. The results show no change (less than 2.5%; σ) in the absorbance of the solution up to 5 days (see FIG. 3).

Figure 4:
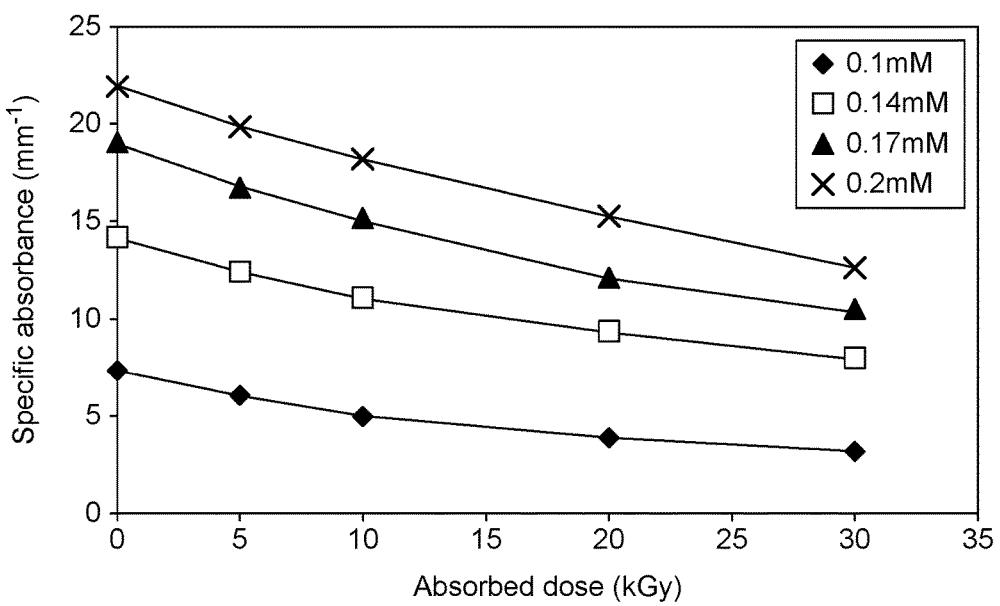
FIG. 4: Specific absorbance of Calcein-PVA film dosimeters containing different concentration of Calcein as a function of absorbed dose up to 30 kGy.
Figure 5:
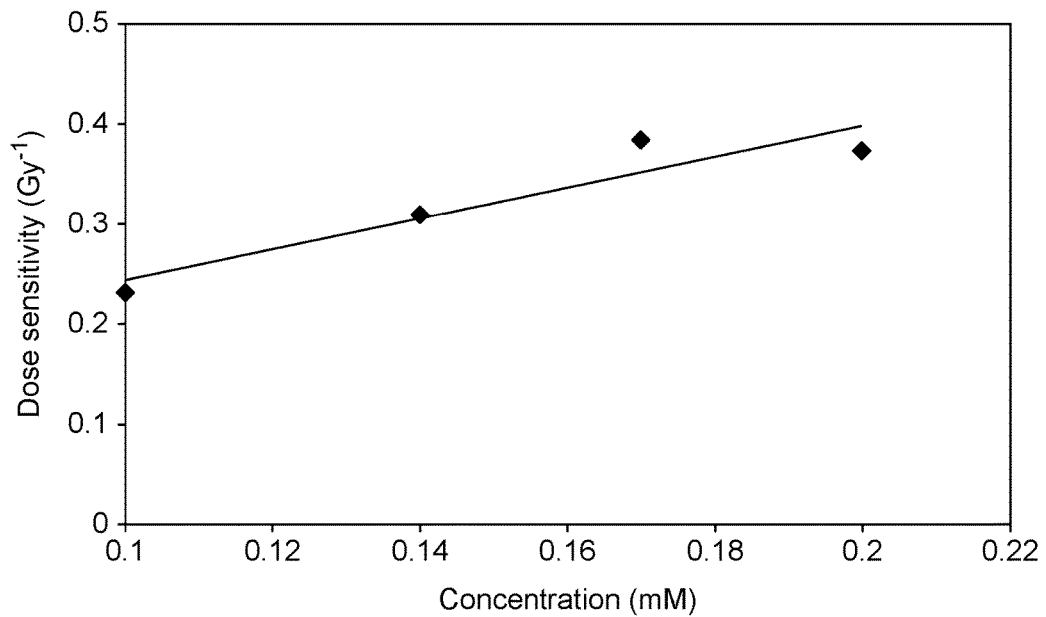
FIG. 5. The dose sensitivity for different Calcein-PVA film dosimeters

The effect of the dye concentrations on the gamma irradiation-induced color bleaching of Calcein-PVA film was investigated by preparing different compositions of Calcein-PVA films. The absorption spectra of un-irradiated as well as irradiated CA-PVA films dosimeter were measured in the range 400-800 nm. The dose response curves were established in terms of change in absorption peak measured at 493 nm for film dosimeters per thickness in mm (specific value) versus the absorbed dose. The colour bleaching of Calcein-PVA film increases gradually with increasing absorbed dose up to up to 30 kGy, which can be seen from decrease of the individual relative absorbance-dose curve (see FIG. 4). As the absorbed dose increases, more hydrate electrons and free radicals are generated leading to breakage of bonds of Calcein dye, resulting in the disappearance of chromophore. A set of three films was used for each dose and the average was reported. The dose sensitivity was taken from the absolute slope of linear plot of specific absorbance versus absorbed dose (linear portion of curve from 0 to 20 kGy) of FIG. 4. The results show that the sensitivity value increases gradually with increasing Calcein dye concentrations as shown in FIG. 5, indicating that films containing higher concentrations of Calcein dye are more suitable for higher dose dosimetry.

Figure 6:
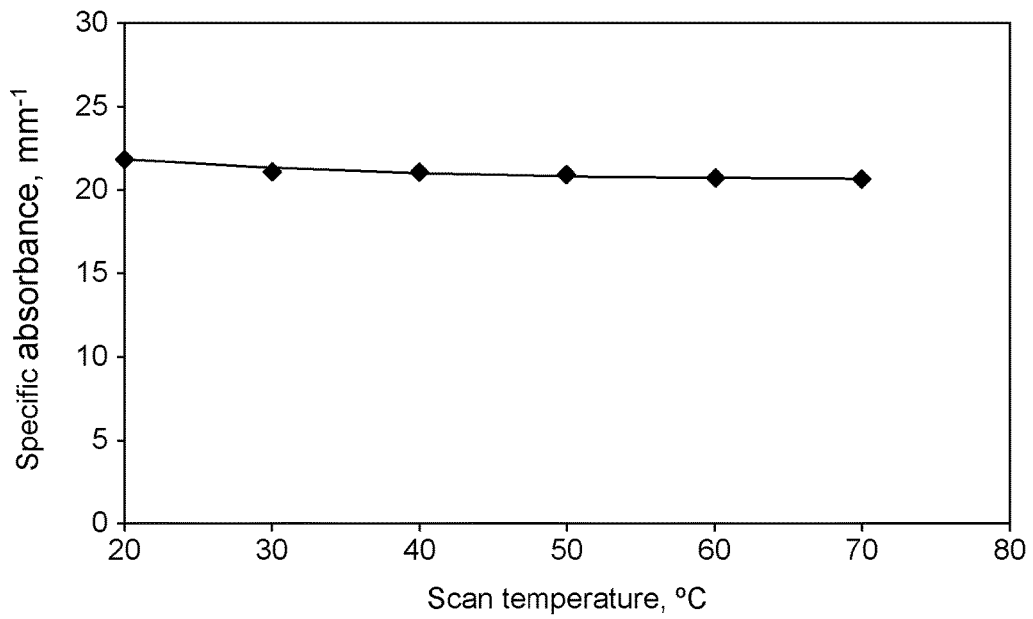
FIG. 6: Specific absorbance as a function of scan temperature for 0.2 mM Calcein-PVA film dosimeters

The effect of scan temperature on Calcein-PVA film dosimeter was conducted using Thermostated UV cary. The absorbance curves were established in terms of change in absorption peak measured at 493 nm of 0.2 mM Calcein-PVA film dosimeters (see FIG. 6). The results show that a slight changes in absorbance of Calcein-PVA film dosimeters with increases of scan temperature, indicates that CA-PVA films were insensitive to temperature up to 70° C.

Figure 7:
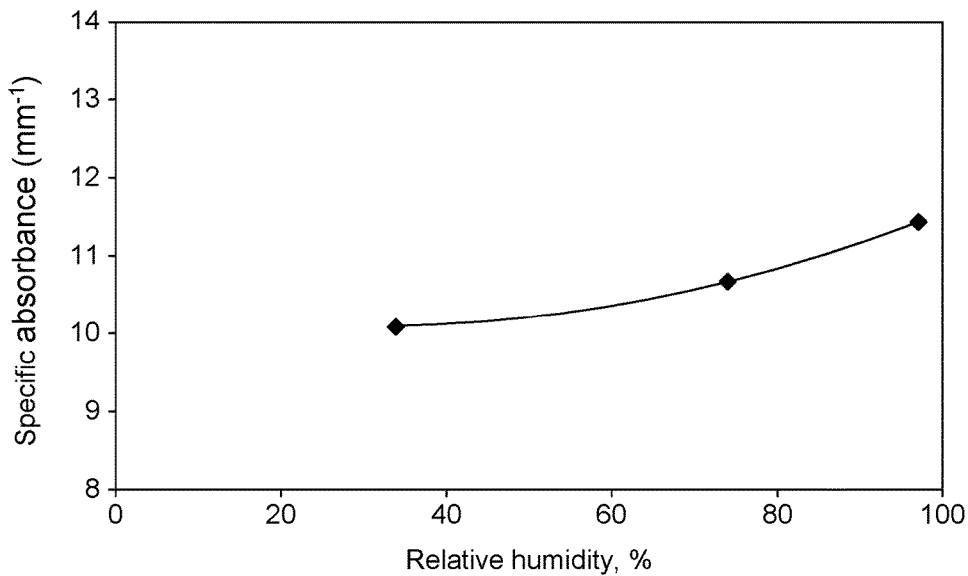
FIG. 7: Specific absorbance of 0.14 mM CA-PVA film dosimeters at 10 kGy.

The effect of humidity on the CA-PVA film dosimeters was investigated by storing film samples containing 0.14 mM CA dye in vials in different humidity environments (in 34%, 74% and 97% relative humidity) for three days, then the films were irradiated in the same vials 10 kGy. A set of three films was used for each vial, and the average response was reported. The variation in absorbance of the irradiated films relative humidity is demonstrated in FIG. 7. The results show that the dose response increases slowly with increasing relative humidity, indicating that Calcein-PVA poses very good stability in this applicable range of relative humidity.

Figure 8:
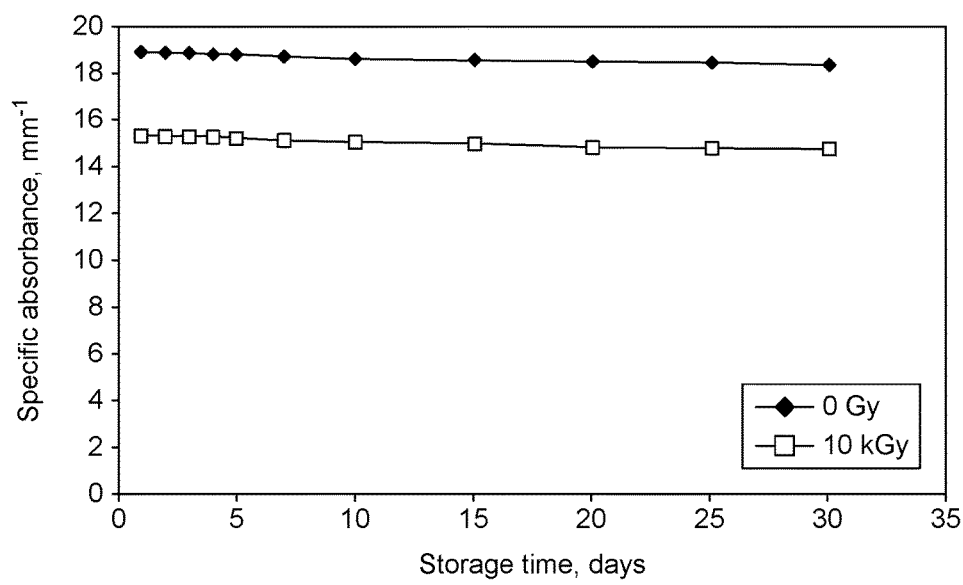
FIG. 8: Specific absorbance of 0.17 mM Calcein-PVA film dosimeters at 0 and 10 kGy.

The stability of Calcein-PVA films dosimeters was tested by measuring the absorbance of film 0.17 mM Calcein. The films were irradiated to 0 and 10 kGy and kept under normal laboratory conditions of temperature and humidity in the dark. The absorbance of the irradiated Calcein-PVA films was using UV/vis spectrophotometer for 30 days after irradiation. The results show no change (less than 4%; σ) in the specific absorbance of the film up to 30 days (see FIG. 8) which means that the Calcein-PVA films has high stability with a wide range of doses.

Accordingly, the specification and drawings are to be regarded in an illustrative rather than a restrictive sense.

What we claim is:

1. A method of making a radiochromic dosimeter film, comprising:
    dissolving 0.51 g of a Calcein indicator in 300 ml of distilled water to make a Calcein dye solution,
    stirring the Calcein dye solution continuously at a room temperature for 5 minutes to ensure homogenous solution;
    dissolving 21.0 g polyvinyl alcohol (PVA) powder in 300 ml of distilled water at temperature of 70° C. to make a PVA solution;
    magnetically stirring the PVA solution at 70° C. temperature for 24 hours and then left to cool at room temperature;
    adding portion of the PVA solution and the Calcein dye solution to make a mixture of a PVA-Calcein solution;
    stirring the PVA-Calcein solution continuously for 3 hours using a magnetic stirrer in order to obtain a uniformly mixed PVA-Calcein dye solution; and
    pouring the uniformly mixed PVA-Calcein dye solution onto a horizontal plastic plate and dried at room temperature for 3 to 5 days to make the radiochromic dosimeter film; and
    peeling off the radiochromic dosimeter film and cutting into 1×3 cm pieces, dried, stored and prepared for irradiation.

2. The method of claim 1, wherein mean thickness of the radiochromic dosimeter film is 158±10 μm.

3. The method of claim 2, wherein the radiochromic dosimeter film are protected from a sunlight, fluorescent light, moisture and dust by wrapping them with a black plastic tape.

4. The method of claim 1, wherein the radiochromic dosimeter film was exposed to radiation between 5 to 30 kGy.

5. The method of claim 4, wherein an absorption reading was taken after radiation using a spectrophotometer of the radiochromic dosimeter film.

6. The method of claim 1, wherein the radiochromic dosimeter film was tested to withstand a relative humidity between 35%-97% and had a stable reading for 30 days.

* * * * *